(12) United States Patent
Ji

(10) Patent No.: US 8,965,706 B2
(45) Date of Patent: Feb. 24, 2015

(54) NOISE FILTERING OF SEISMIT DATA

(75) Inventor: Ying Ji, Cambridge (GB)

(73) Assignee: WesternGeco L.L.C., Houston, TX (US)

( * ) Notice: Subject to any disclaimer, the term of this patent is extended or adjusted under 35 U.S.C. 154(b) by 511 days.

(21) Appl. No.: 13/499,642

(22) PCT Filed: Sep. 20, 2010

(86) PCT No.: PCT/IB2010/002385
§ 371 (c)(1),
(2), (4) Date: May 31, 2012

(87) PCT Pub. No.: WO2011/045641
PCT Pub. Date: Apr. 21, 2011

(65) Prior Publication Data
US 2012/0245851 A1    Sep. 27, 2012

(30) Foreign Application Priority Data

Oct. 12, 2009 (GB) .................................. 0917814.6

(51) Int. Cl.
*G06F 19/00* (2011.01)
*G01V 1/36* (2006.01)
*G01V 1/37* (2006.01)

(52) U.S. Cl.
CPC .......... *G01V 1/364* (2013.01); *G01V 2210/324* (2013.01); *G01V 1/375* (2013.01); *G01V 2210/3246* (2013.01)
USPC ................... 702/17; 367/38; 367/43; 367/45; 367/46; 367/52; 181/112

(58) Field of Classification Search
CPC .. G01V 1/364; G01V 2210/324; G01V 1/375
USPC ........ 702/17; 367/38, 43, 45, 46, 52; 181/112
See application file for complete search history.

(56) References Cited

U.S. PATENT DOCUMENTS 4,556,962 A * 12/1985 Widrow .......................... 367/45
4,890,264 A * 12/1989 Crews et al. .................... 367/45

(Continued)

FOREIGN PATENT DOCUMENTS

| GB | 2273358 A | 6/1994 |
| GB | 2337591 A | 11/1999 |
| WO | 03081283 A2 | 10/2003 |

OTHER PUBLICATIONS

Combined Search and Examination Report of British Application Serial No. GB 0917814.6 dated Feb. 11, 2010.

(Continued)

*Primary Examiner* — Carol S Tsai

(57) ABSTRACT

Adaptive filtering method to remove ground roll from seismic data. In an M channel adaptive filter, weights $W_i$ are set using an adaptive algorithm based on seeking the minimum in the partial differential of cost function J. The cost function includes an expansion of the primary trace d into $d=d_g+\Delta d$ (where: $d_g$ is ground roll contribution and $\Delta d=d_{sig}+d_{ran}$, where $d_{sig}$ is the reflected signal component and $d_{ran}$ is a random noise component) and a corresponding expansion of the reference x into $x=x_g+\Delta x$ (where $x_g$ is ground roll contribution and $\Delta x=x_{sig}+x_{ran}$; where $x_{sig}$ is a reflected signal component and $x_{ran}$ is a random noise component). The delta components are included in the denominator of cost function J to provide an optimal solution of the filter coefficients biased by the reflection signal and random noise is removed.

8 Claims, 3 Drawing Sheets

(56) References Cited

U.S. PATENT DOCUMENTS

| | | | |
|---|---|---|---|
| 5,237,538 A | 8/1993 | Linville, Jr. et al. | |
| 5,555,530 A * | 9/1996 | Meehan | 367/45 |
| 5,971,095 A * | 10/1999 | Ozbek | 181/112 |
| 6,185,299 B1 * | 2/2001 | Goldin | 379/406.08 |
| 6,446,008 B1 * | 9/2002 | Ozbek | 702/17 |
| 6,651,007 B2 * | 11/2003 | Ozbek | 702/17 |
| 6,801,473 B2 * | 10/2004 | Matteucci et al. | 367/47 |
| 6,961,283 B2 * | 11/2005 | Kappius et al. | 367/43 |
| 8,593,907 B2 * | 11/2013 | Perciot et al. | 367/22 |
| 8,612,158 B2 * | 12/2013 | Yu | 702/17 |
| 8,625,389 B2 * | 1/2014 | Perciot et al. | 367/21 |
| 8,773,949 B2 * | 7/2014 | Martin et al. | 367/38 |
| 8,818,763 B2 * | 8/2014 | Ji et al. | 702/191 |
| 2003/0078734 A1 * | 4/2003 | Ozbek | 702/14 |
| 2003/0176975 A1 * | 9/2003 | Matteucci et al. | 702/17 |
| 2012/0163122 A1 * | 6/2012 | Ozdemir et al. | 367/24 |

OTHER PUBLICATIONS

International Search Report of PCT Application No. PCT/IB2010/002385 dated Apr. 28, 2011.

* cited by examiner 2a  2b 2c  2d 3a  3b

NOISE FILTERING OF SEISMIT DATA

BACKGROUND

Embodiments are provided relating to noise filtering of seismic data, and in particular, but not by way of limitation, to filtering seismic data obtained from a sensor array in order to remove or attenuate ground roll.

In seismic surveys, a source induces seismic waves at or near the surface of the earth. These waves propagate through the earth and reflections from different layers within the earth can be detected by sensors, or geophones, at the earth's surface. The seismic source vibrations applied to the earth's surface also generate a so-called surface wave or ground roll which propagates through the shallow layers of the earth.

At the sensors/geophones, the time of incidence of the low frequency, low speed ground roll typically may coincide with the incidence of reflections from the deep layers of interest in the seismic survey. The simultaneous presence of the ground roll with the reflected signals may make it difficult to make full use of the seismic data as the ground roll often masks the reflected waves. Several methods are known for attenuating ground roll interference and thus reducing its effect on the seismic signal of interest. Typically, geophones are not used individually, but rather are connected in sub-arrays, or groups, which are hard-wired or summed together. This is a form of data-independent beam forming.

Adaptive signal processing has been applied in various forms in order to suppress the ground roll contribution.

U.S. Pat. No. 4,556,962 discloses a method for attenuating the ground roll from a surface seismic source by placing a sensor close to the source to detect the interfering noise. The interfering noise is scaled, delayed and summed with signals from a more distant geophone array and then cross-correlated with the original vibration source. U.S. Pat. No. 4,556,962 also suggests that an adaptive filter may be used so as to modify the delayed signal to correspond more closely to that detected by the more distant geophone array. However, the ground roll measured close to the source may be substantially different from that received by the geophone array, and the adaptive filter may not be able to account for this difference.

U.S. Pat. No. 4,890,264 discloses a method for suppressing non-uniformly distributed noise generated by surface wave propagation. In U.S. Pat. No. 4,890,264, horizontal geophones for detecting surface waves are used with conventional vertically orientated geophones for detecting seismic energy. The outputs of the surface wave detectors are used in conjunction with an adaptive filter to cancel the effects of the surface wave interference. This method for the suppression of ground roll is inherently a multi-component method. Some seismic wave energy also gets detected by the horizontally sensitive geophones, and this may cause signal cancellation.

GB-A-2273358 discloses linearly constrained adaptive beam forming and adaptive interference cancelling beam forming for ground roll suppression. This method filters signals measured by an array of geophones and sums them in such a way as to preserve signals incident from a preferred direction while suppressing interference incident from other directions. The filtering is performed using a continuously adaptive method with the moveout differential between the seismic reflections and the ground roll being used to form primary and reference channels. The suggested application for the disclosed method is in drilling when using a drill as a seismic source, where the ground roll is effectively stationary due to the slow travel of the drill bit and each source receiver position produces a lot of data. This ensures that the stochastic-gradient-type of algorithms used in the adaptive filters of this method are able to converge. However, in surface seismic experiments the ground roll present is often non-stationary and inhomogeneous and the stochastic-gradient-type of algorithms may be too slow to converge within the signal envelope.

U.S. Pat. No. 5,237,538 discloses a method for removing coherent noise from seismic data. This method firstly identifies the moveout characteristics of the noise, defines and extracts a space-time gate containing the noise, and removes the moveout to flatten the noise train. Amplitudes and time variations are then removed from the gate. The coherent noise is estimated using a beam steer operator (conventional stacking in this case) or by f-x filtering in the Fourier transform domain. The filtered noise estimate is subtracted from the data trace containing the signal-plus-noise using a short three to five point single filter. Inverse amplitude scalars are applied to undo the effect of earlier amplitude equalisation. The signal is then moveout restored into the original seismic record.

U.S. Pat. No. 5,971,095 disclosed a data adaptive principal component multi-channel filter bank to attenuate the coherent noise. This method works very well when the noise reference does not contain reflected signals. Like any other Least Square or Least Mean Square based adaptive noise canceller, this method assumes that the correlation of the signal and the noise is negligible compared with the correlation of the noise reference and the noise at the primary trace and its success depends on constructing the signal free noise references.

SUMMARY

According to a first aspect there is provided a computer-implemented adaptive filtering method to remove ground roll from seismic data. A seismic data set is obtained by exciting a seismic source to generate energy which propagates through a subsurface and is partially reflected by structure in the subsurface to an array of receivers, such as geophones or hydrophones; the receivers thereby receiving reflected signal and additionally a ground roll contribution. An adaptive filter is used which comprises a plurality of M filter channels having respective weights $w_i$ and time windows $h_i$. The adaptive filter is configured using an adaptive algorithm to obtain values for the weights $w_i$ by seeking a minimum in a cost function J; and the data set is filtered with the configured adaptive filter to attenuate ground roll.

The adaptive algorithm obtains values for the weights $w_i$ by seeking a minimum in a cost function J. It regards the measured signal d as being represented by a summation of a ground roll contribution $d_g$ and a delta contribution $\Delta d$, the delta contribution $\Delta d$ being a summation of a reflected signal component and an random noise component ($d=d_g+\Delta d$), and further regards the reference signal x as being represented as the summation of a reference ground roll contribution $x_g$ and a reference delta contribution $\Delta x$, the reference delta contribution $\Delta x$ being a summation of a reflected signal component and an random noise component ($x=x_g+\Delta x$). The cost function J contains a normalization factor including the delta contribution $\Delta d$ and the reference delta contribution $\Delta x$.

The above method can provide improved performance compared with an adaptive filter based on a least square error cost function.

The reference delta contribution $\Delta x$ may be pre-calculated by processing a portion of the seismic data set that is known to be substantially free of a ground roll contribution.

According to a second aspect, there is provided an adaptive filter operable to remove ground roll from a measured signal of seismic data, comprising: a plurality of M filter channels having respective weights $w_i$ and time windows $h_i$; the filter channels having inputs operable to receive an input signal and an output connected to combine respective outputs from the M filter channels; and an adaptive algorithm operable to obtain values for the weights $w_i$ by seeking a minimum in a cost function J, wherein the adaptive algorithm regards the measured signal d as being represented by a summation of a ground roll contribution $d_g$ and a delta contribution $\Delta d$, the delta contribution $\Delta d$ being a summation of a reflected signal component and a random noise component ($d=d_g+\Delta d$), wherein the adaptive algorithm regards the reference signal x as being represented as the summation of a ground roll contribution $x_g$ and a delta contribution $\Delta x$, the delta contribution $\Delta x$ being a summation of a reflected signal component and an random noise component ($x=x_g+\Delta x$), and wherein the cost function J contains a normalization factor including the delta contribution $\Delta d$ and the delta contribution $\Delta x$.

According to a third aspect, there is provided a results data set obtained by adaptive filtering a seismic data set, wherein the seismic data set is obtained by exciting a seismic source to generate energy which propagates through a subsurface and is partially reflected by structure in the subsurface to an array of receivers, the receivers thereby receiving reflected signal and additionally also a ground roll contribution, the adaptive filtering comprising: providing an adaptive filter comprising a plurality of M filter channels having respective weights $w_i$ and time windows $h_i$; configuring the adaptive filter using an adaptive algorithm to obtain values for the weights $w_i$ by seeking a minimum in a cost function J; and filtering the data set with the configured adaptive filter to attenuate ground roll, wherein the seismic data set comprises a measured signal d which is represented in the adaptive algorithm as a summation of a ground roll contribution $d_g$ and a delta contribution $\Delta d$, the delta contribution $\Delta d$ being a summation of a reflected signal component and a random noise component ($d=d_g+\Delta d$), wherein a reference signal x used by the adaptive algorithm is represented as the summation of a ground roll contribution $x_g$ and a reference delta contribution $\Delta x$, the delta contribution $\Delta x$ being a summation of a reflected signal component and an random noise component ($x=x_g+\Delta x$), and wherein the cost function J contains a normalization factor including the delta contribution $\Delta d$ and the reference delta contribution $\Delta x$.

According to a fourth aspect, there is provided a computer system loaded with machine readable instructions executable to carry out an adaptive filtering method to remove ground roll from seismic data, the method comprising: providing a seismic data set obtained by exciting a seismic source to generate energy which propagates through a subsurface and is partially reflected by structure in the subsurface to an array of receivers, the receivers thereby receiving reflected signal and additionally also a ground roll contribution; providing an adaptive filter comprising a plurality of M filter channels having respective weights $w_i$ and time windows $h_i$; configuring the adaptive filter using an adaptive algorithm to obtain values for the weights $w_i$ by seeking a minimum in a cost function J; and filtering the data set with the configured adaptive filter to attenuate ground roll, wherein the seismic data set comprises a measured signal d which is represented in the adaptive algorithm as a summation of a ground roll contribution $d_g$ and a delta contribution $\Delta d$, the delta contribution $\Delta d$ being a summation of a reflected signal component and an random noise component ($d=d_g+\Delta d$), wherein a reference signal x used by the adaptive algorithm is represented as the summation of a ground roll contribution $x_g$ and a reference delta contribution $\Delta x$, the reference delta contribution $\Delta x$ being a summation of a reflected signal component and an random noise component ($x=x_g+\Delta x$), and wherein the cost function J contains a normalization factor including the measured delta contribution $\Delta d$ and the reference delta contribution $\Delta x$.

According to a fifth aspect, there is provided a data storage medium bearing machine readable instructions executable to carry out an adaptive filtering method to remove ground roll from seismic data, the method comprising: providing a seismic data set obtained by exciting a seismic source to generate energy which propagates through a subsurface and is partially reflected by structure in the subsurface to an array of receivers, the receivers thereby receiving reflected signal and additionally also a ground roll contribution; providing an adaptive filter comprising a plurality of M filter channels having respective weights $w_i$ and time windows $h_i$; configuring the adaptive filter using an adaptive algorithm to obtain values for the weights $w_i$ by seeking a minimum in a cost function J; and filtering the data set with the configured adaptive filter to attenuate ground roll, wherein the seismic data set comprises a measured signal d which is represented in the adaptive algorithm as a summation of a ground roll contribution $d_g$ and a delta contribution $\Delta d$, the delta contribution $\Delta d$ being a summation of a reflected signal component and an random noise component ($d=d_g+\Delta d$), wherein a reference signal x used by the adaptive algorithm is represented as the summation of a ground roll contribution $x_g$ and a reference delta contribution $\Delta x$, the reference delta contribution $\Delta x$ being a summation of a reflected signal component and an random noise component ($x=x_g+\Delta x$), and wherein the cost function J contains a normalization factor including the measured delta contribution $\Delta d$ and the reference delta contribution $\Delta x$.

The temporal window functions $h_i$ may be characterized by the requirement that only adjoining windows overlap.

The application of the temporal window functions, and hence the resulting temporal windows, to the combined components may provide that the filtering means is local in time and as such may allows the method to adaptively remove noise from the seismic data in accordance with a global optimisation criterion, e.g. to solve the optimisation of the filtered signal by minimising the mean square value of the filtered signal over time.

The invention may be applicable for two-dimensional (2D) and three-dimensional (3D) seismic surveys, and can be used in land seismic, marine seismic, including sea bottom seismic, and transitional zone seismic.

The method can be performed on stored data or on raw seismic data as it is acquired. Thus raw seismic data may be filtered according to the method at the data acquisition site. This ensures that a "cleaned" signal is available from the data acquisition site and may be downloaded directly from the site in this form. This reduces the amount of data that must be sent for analysis off-site and reduces the costs and storage problems associated with accumulating sufficient quantities of noisy data for analysis off-site. The method can be applied to single-sensor recordings, i.e. to recordings prior to any group forming which combines the signals of two or more seismic sensors.

The seismic data and the reference noise may be pre-processed before being passed to the adaptive filtering means by dividing the signal into different frequency bands, merely by way of example by using a quadrature mirror filter. This allows a reduction in the number of data points to be processed and may also allow a reduction in the number of coefficients in the adaptive filtering means.

The data selection temporal window functions are may be determined by two requirements, wherein the first requirement is that the sum over all windows at any given time equals unity and the second requirement is that only adjoining windows overlap.

Where the decoupled equation is solved using the method of principal components, the number of principal components may be adjusted to vary the degree of filtering and achieve the desired accuracy of filtering.

The adaptive filtering may be achieved by use of a filtering means, or filtering bank, comprising a plurality of local filters. Each local filter may comprise a multichannel filter. In a further embodiment of the invention, another signal may be used to partially configure the adaptive filtering.

In land based surveys, the seismic data signals for use in methods in accordance with embodiments of the invention may be acquired from at least two seismic sensing means, typically geophones, the sensing means being arranged in a net, where each sensing means is independent of the other, and each sensing means sends data signals to a processing means on site to be filtered in accordance with the invention. A net is defined as an areal array of sensing means, or geophones, where each sensing means is independent of all other sensing means in the net. This differs from prior art arrangements where each geophone is arranged in an interconnected array and the signals received by the geophones are averaged over the array in an attempt to reduce noise effects such as ground roll prior to data processing off-site.

In a further embodiment of the invention, the filtered output signal may be reprocessed in an iterative manner to a further filter the noise, the filter output signal typically being fed back to the reference signal and filtering means.

The reference signal may be generated by a number of techniques, of which one example is by moveout differentiation of the data signals.

In another technique the reference signal may be obtained by median stacking. This suppresses seismic signals that do not have the same moveout as the noise to be filtered. Thus the contamination of the reference signal with the seismic signal of interest is reduced.

In a combination of these two techniques, median stacking may be followed by moveout differentiation of the stacked signals.

Where the seismic data is obtained from multi-component sensing means, the reference signal may be obtained by polarisation filtering of each component sensed by the sensing means. This method may be used to enhance the reference signals from adjacent sensing means which is of particular advantage for three dimensional exploration, i.e. three components, and may also be combined with moveout differentiation.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1:
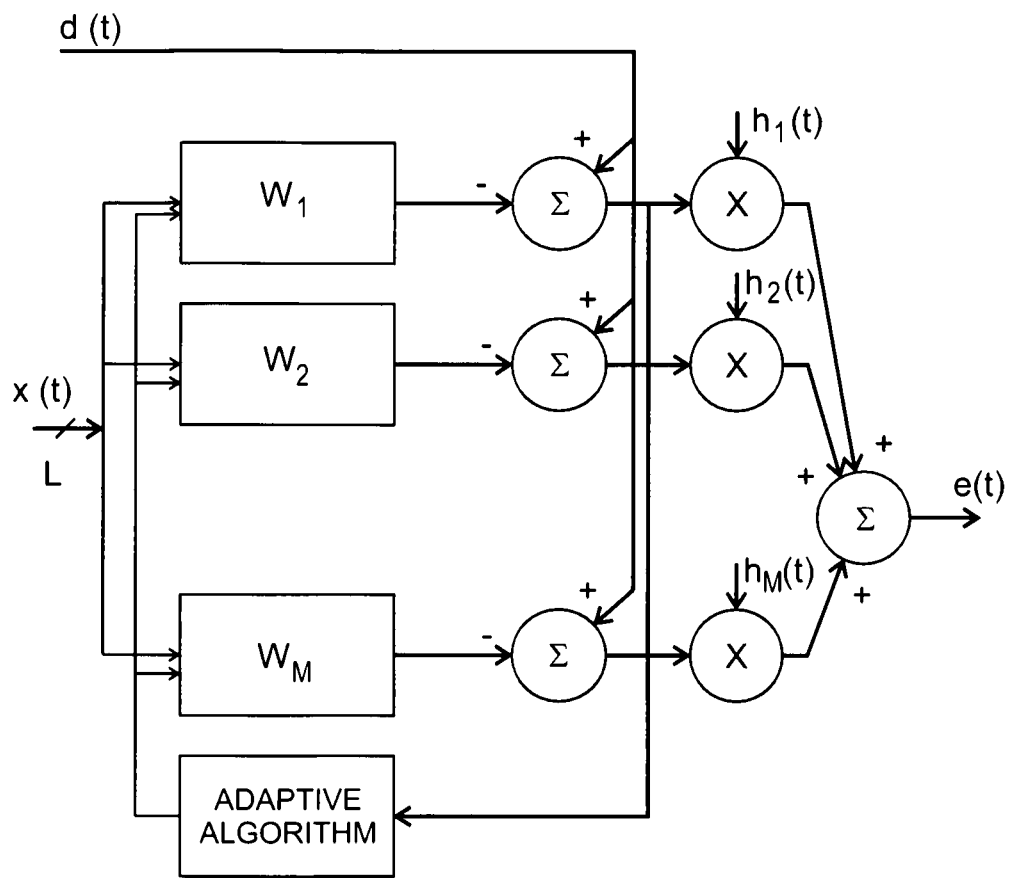
FIG. 1 illustrates the structure of a multi-channel adaptive noise canceller according to an embodiment of the invention in which d(t) is the primary trace, $W_i$ are coefficients of M filters, x(t) are L channels of noise references, $h_i(t)$ are M output windows, and e(t) is the error signal output.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to, portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

FIG. 1 depicts the system of adaptive noise cancelling. Defining the multi-channel tap-input vector at time t as x(t) and the tap-weight vector $w_i$, the cost function can be written as $$J = \sum_{t=1}^{N} \left[ \sum_{i=1}^{M} h_i(t)(d(t) - w_i^T x(t)) \right]^2 \quad [1]$$

where $h_i(t)$ are the windows applied at the output end, N is the total number of samples, M is the number of local multi-channel adaptive filters, and d(t) is the primary trace. The windows $h_i(t)$ are constrained by $$\sum_{i=1}^{M} h_i(t) = 1 \quad [2]$$

for
$t = 1, 2, \ldots, N$
and $$h_i(t)h_j(t) = 0 \quad [3]$$

for
$j \neq i-1, i, i+1$

Using these two constraints enables the global optimization of equation [1] to be solved. Assuming that the input vector x(t) in equation [1] contains the reflection signals $x_{sig}$, random noise $x_{ran}$ and ground roll $x_g$, let $\Delta x = x_{sig} + x_{ran}$, then input vector x(t) can be represented as $x_g + \Delta x$. Similarly assuming that the primary trace d(t) also contains the reflections signals $d_{sig}$, random noise $d_{ran}$ and the ground roll $d_g$, let $\Delta d = d_{sig} + d_{ran}$, then the primary trace d(t) can be represented as $d_g + \Delta d$. If the correlation of the signal and the interference noise is negligible compared with the correlation of the noise reference and the interference noise at the primary trace, the cost function of equation [1] can be reformulated as $$J = \sum_{t=1}^{N} \left[ \sum_{i=1}^{M} h_i(t)(d_g(t) - w_i^T x_g(t)) \right]^2 + \quad [4]$$

$$\sum_{i=1}^{M} \sum_{l=i-1}^{i+1} \sum_{t=1}^{N} h_i(t)h_j(t)(\Delta d(t)^2 + w_i^T \Delta x(t) \Delta x(t)^T w_l) \approx$$

$$\frac{\sum_{t=1}^{N} \left[ \sum_{i=1}^{M} h_i(t)(d_g(t) - w_i^T x_g(t)) \right]^2}{\sum_{t=1}^{N} \sum_{i=1}^{M} \sum_{l=i-1,i,i+1} h_i(t)h_l(t)(\alpha + w_l^T w_l)} + \sigma$$

with assumptions that the correlations of $\Delta d$ and $\Delta x$, $\Delta d$ and $d_g$, $\Delta d$ and $x_g$, $\Delta x$ and $d_g$, $\Delta x$ and $x_g$ are negligible and the diagonal elements is the matrix $\Delta x(t) \Delta x(t)^T$ are most significant elements. $\sigma$ is the noise power in the noise references. $\alpha$ is the ratio of the noise in the primary trace and the noise in the noise references, it can be estimated by using P samples in the primary trace and the noise references where the random noise and the reflection signals are the most significant components, formulated as.

$$\alpha = \frac{\sum_{t=1}^{P} d^2(t)}{\text{trace}(x(t)x^T(t))}$$

The advantage of using cost function of equation [4] is that it eliminates the biased solution caused by the perturbations $\Delta x(t)$ in the noise references. If a priori information of noise correlation matrix is available, it can be incorporated in the equation [4]. Since the cost function of equation [4] is non-linear, an iterative optimization algorithm, such as genetic algorithm or simulate annealing when the cost function contains many local minima, or the derivative based methods such as the steepest decent or conjugate gradient, can be used to find the optimal solution $w_i$ to minimize the cost function of equation [4].

U.S. Pat. No. 5,971,095 introduces the approximation into the cost function of equation [1]. It can be formulated as $$\sum_{t=1}^{N} \sum_{i=1}^{M} \sum_{j=i-1,t,i+1} h_i(t)h_j(t)(d(t) - w_i^T x(t))(d(t) - w_j^T x(t)) \approx \quad [5]$$

$$\sum_{t=1}^{N} \sum_{i=1}^{M} \sum_{j=i-1,t,i+1} h_i(t)h_j(t)(d(t) - w_i^T x(t))^2$$

It decouples the global cost function of equation [1] into the summation of M local filters. The decoupled cost function in each local filter can be reformulated as $$J \approx \sum_{i=1}^{M} \sum_{t=1}^{N} h_i(t)(d(t) - w_i^T x(t))^2 \quad [6]$$

Introducing the perturbation terms $\Delta d$ and $\Delta x$ to the d(t) and x(t) of equation [6] respectively, the cost function of equation [6] can be written as $$J \approx \sum_{i=1}^{M} \sum_{t=1}^{N} h_i(t)(d(t) + \Delta d - w_i^T x(t) - w_i^T \Delta x(t))^2 \quad [7]$$

The term $w_i^T \Delta x(t)$ in equation [7] biases the estimation of the filter coefficients. Using the assumptions of the crosscorrelation among d(t), x(t), $\Delta d$ and $\Delta x$, the unbiased optimal solution for each of the M local filter $w_i$ can be found by setting the partial differential of J with respect to $w_i$ equals to zero, which can be formulated as a total least square problem $$(R + \Delta R)w_i = b + \Delta b \quad [8a]$$

where $$R = \sum_t h_i(t)x(t)x^T(t)$$

$$\Delta R = \sum_t h_i(t)\Delta x(t)\Delta x^T(t)$$

and

-continued $$b = \sum_t d(t)x(t) \quad [8b]$$

$$\Delta b = \sum_t \Delta d(t)\Delta x(t)$$

then equation [8b] can be reformulated as $$([R\ b] + [\Delta R\ \Delta b])\begin{pmatrix} w_i \\ -1 \end{pmatrix} = 0 \quad [9]$$

The optimal solution of equation [9] by minimizing both $\Delta R$ and $\Delta b$ is the sum of eigenvectors with small eigen values of [R b].

Mathematically equation [4] gives the maximum likelihood estimation of filter coefficients only when the noises have Gaussian distribution. It is also noted that the solution by minimizing equation [4] is an unbiased estimation when the un-modeled noises are uncorrelated. However in the application of ground roll suppression of seismic data one part of these un-modeled noises are reflected waves. They usually do not have Gaussian distribution and are correlated, but it is possible to estimate the scaled version of the covariance matrix $[\Delta R\ \Delta b]$ formulated as equation [8b] by using the samples or the estimated approximation distribution from the clean part of seismic data where there is no ground roll. Incorporating this a priori noise covariance matrix, equation [4] can be re-formulated as $$J = \frac{\sum_{t=1}^{N} \left[\sum_{i=1}^{M} h_i(t)(d_g(t) - w_i^T x_g(t))\right]^2}{\sum_{t=1}^{N}\sum_{i=1}^{M}\sum_{l=t-1,l\neq t+1} h_i(t)h_l(t)} \quad [10]$$

$$(\Delta d^2(t) - w_i^T \Delta d \Delta x - \Delta d \Delta x^T w_j + w_i^T \Delta x(t) \Delta x^T(t) w_i)$$

Introducing the approximations that U.S. Pat. No. 5,971,095 uses, the decoupled cost function can be formulated as $$J = \frac{\sum_{t=1}^{N} [h_i(t)(d_g(t) - w_i^T x_g(t))]^2}{\sum_{t=1}^{N} h_i(t)(\Delta d^2(t) - 2\Delta d \Delta x^T w_i + w_i^T \Delta x(t) \Delta x^T(t) w_i)} \quad [11]$$

The gradient based optimization methods, such as steepest descent or conjugate gradient algorithms, can be used to find the optimal solution of filter coefficients by minimizing equation [10] or [11].

Figure 2:
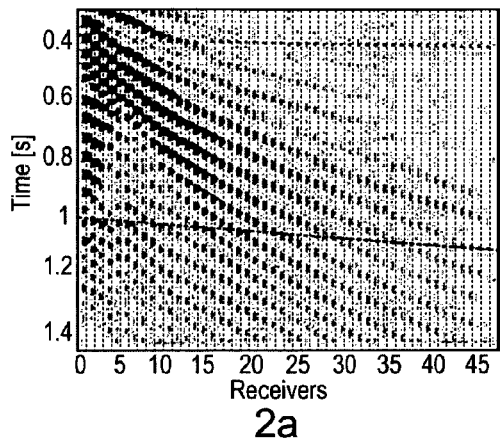
FIG. 2 is a set of graphs of time plotted against source-receiver separation, i.e. offset, for an example seismic data set, showing: (a) the unfiltered data; (b) the adaptively filtered data; (c) the estimated ground roll calculated by (a)-(b); and (d) the residual calculated by subtracting the two added synthetic reflections from (b).
Figure 2:
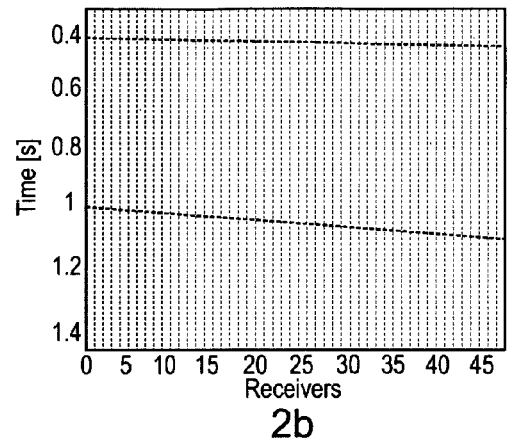
Figure 2:
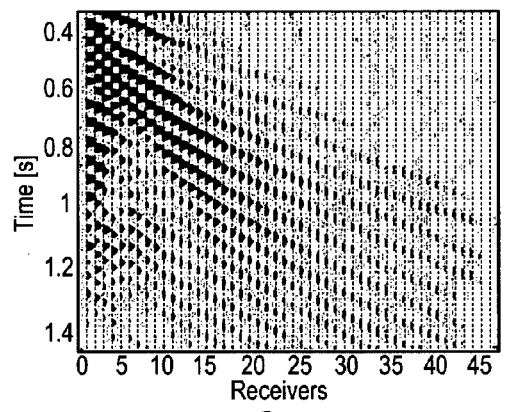
Figure 2:
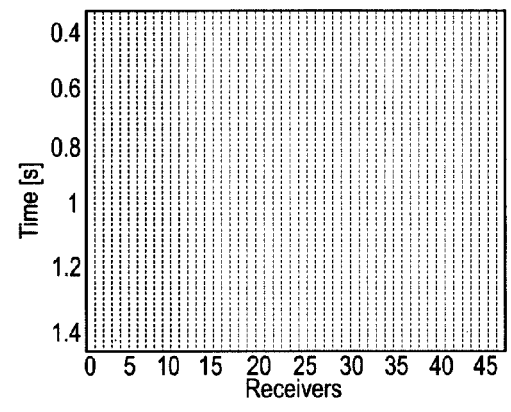

FIG. 2 shows an example of noise attenuation using this disclosed invention. In this example, only two traces, one on each side of the primary trace, were used as references, and there are 30 coefficients for each channel. The output windows are triangle with 100 samples in length with 50 samples overlap. The noise moveout is set to 100 traces per second. FIG. 2(a) shows the unfiltered data. FIG. 2(b) is the filtered data. FIG. 2(c) is the estimated ground roll which is calculated by subtracting FIG. 2(b) from FIG. 2(a). FIG. 2(d) is the residual which is calculated by subtracting the two added synthetic reflections from FIG. 2(b). The last panel (FIG. 2d) shows the amount of signal distortion. From FIGS. 2(b) and 2(c), the strong low frequency ground roll has been attenuated significantly while the two added synthetic signals are well preserved.

Figure 3:
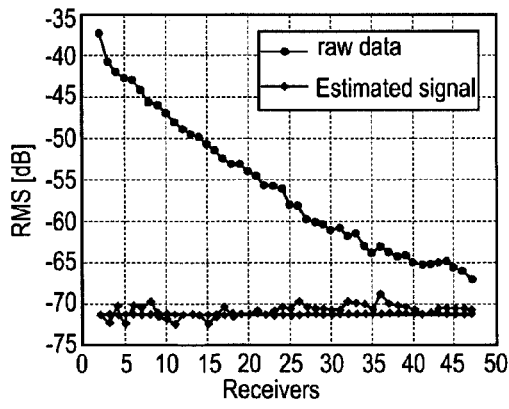
FIGS. 3(a) and 3(b) plot trace-by-trace RMS values in dB to illustrate ground noise attenuation from noise filtering systems, in accordance with embodiments of the present invention.
Figure 3:
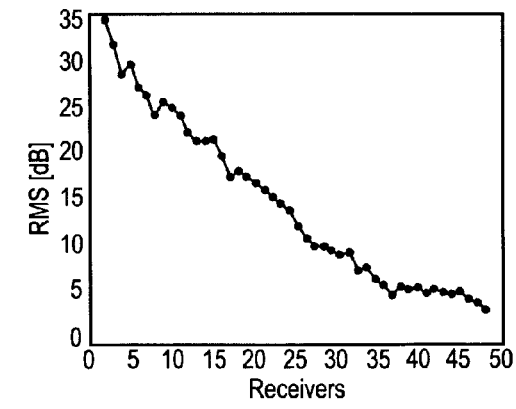

FIGS. 3(a) and (b) show the trace-by-trace Rooted Mean Square (RMS) values of the noise attenuation results in dB. In FIG. 3(a), the blue curve is the RMS of the unfiltered data, the red is the filtered result, and the horizontal line is the RMS of the synthetic reflection signals. The closer the red curve to the horizontal line, the better the filter performs. FIG. 3(b) shows the noise attenuation in dB. The ground roll has been attenuated by more than 30 dB at near offsets.

Figure 4:
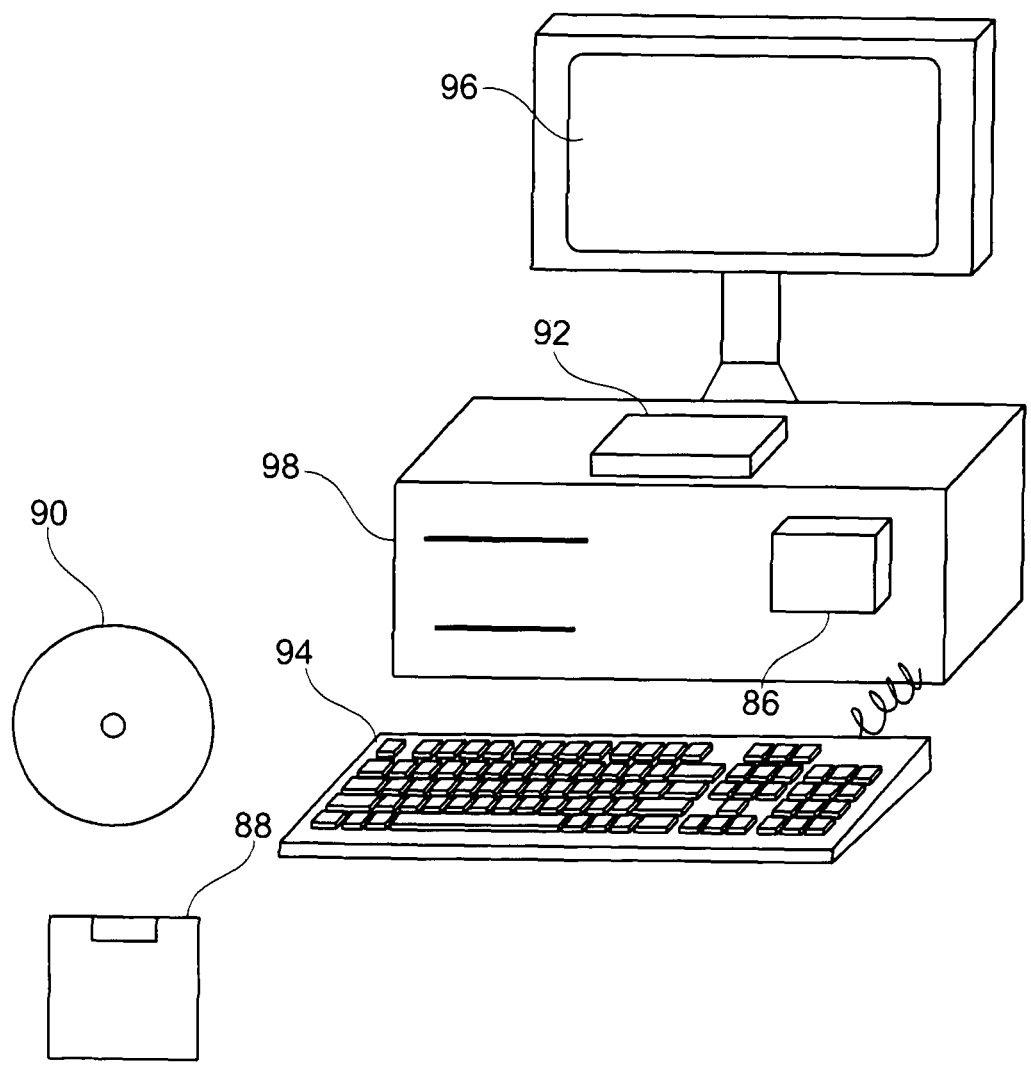
FIG. 4 shows a programmable computer and an associated computer readable medium bearing machine-readable instructions in the form of a computer program.

FIG. 4 illustrates a computer readable medium, such as disk 88, CD 90 or magnetic hard drive 86 associated with or forming part of a general purpose programmable compute 98r. The foregoing adaptive filtering method can be embodied in computer-readable code stored on a computer readable medium. The computer 98 includes a central processing unit 92, a user input device such as a keyboard 94 and a user display 96 such as a flat panel display or cathode ray tube display. The computer readable medium includes logic operable to cause the computer to execute the adaptive filtering method as set forth above.

In summary, there has been described an adaptive filtering method to remove ground roll from seismic data. In an M channel adaptive filter the weights $w_i$ are set using an adaptive algorithm based on seeking the minimum in a cost function J. The cost function includes an expansion of the primary trace d into $d=d_g+\Delta d$ where $d_g$ is the ground roll contribution and $\Delta d = d_{sig} + d_{ran}$ where $d_{sig}$ is the reflected signal component and $d_{ran}$ is a random noise component, as well as a corresponding expansion of the reference x into $x=x_g+\Delta x$ where $x_g$ is the ground roll contribution and $\Delta x = x_{sig} + x_{ran}$ where $x_{sig}$ is a reflected signal component and $x_{ran}$ is an random noise component. The delta components are then included in the denominator of the cost function J so that the optimal solution of the filter coefficients biased by the reflection signal and random noise in the reference traces is removed.

While the invention has been described with respect to a limited number of embodiments, those skilled in the art, having benefit of this disclosure, will appreciate that other embodiments can be devised which do not depart from the spirit and scope of the invention as disclosed herein. In particular the contents of U.S. Pat. No. 5,971,095 [4] are incorporated herein in their entirety not only as background, but in respect of the disclosure of variations and fields of use of the invention, such as different methods for obtaining convergence with the cost function, the 9 methods for generating the reference signal (column 9, line 9 to column 13, line 12), the applicability in a 3D land survey environment (column 13, line 16 to 45), the applicability in a marine environment (column 15, lines 1 to 50), all of which variations and fields of use are equally applicable to and encompassed by the present invention.

What is claimed is:

1. A computer-implemented adaptive filtering method to remove ground roll from seismic data, the method comprising:
providing a seismic data set obtained by exciting a seismic source to generate energy which propagates through a subsurface and is partially reflected by structure in the subsurface to an array of receivers, the receivers thereby receiving reflected signal and additionally also a ground roll contribution;
providing an adaptive filter comprising a plurality of M filter channels having respective weights $w_i$ and time windows $h_i$;

configuring the adaptive filter using an adaptive algorithm to obtain values for the weights $w_i$ by seeking a minimum in a cost function J; and filtering the data set with the configured adaptive filter to attenuate ground roll, wherein the seismic data set comprises a measured signal d which is represented in the adaptive algorithm as a summation of a ground roll contribution $d_g$ and a delta contribution $\Delta d$, the delta contribution $\Delta d$ being a summation of a reflected signal component and an random noise component ($d = d_g + \Delta d$), wherein a reference signal x used by the adaptive algorithm is represented as the summation of a ground roll contribution $x_g$ and a reference delta contribution $\Delta x$, the reference delta contribution $\Delta x$ being a summation of a reflected signal, component and an random noise component ($x = x_g + \Delta x$), and wherein the cost function J contains a normalization factor including the delta contribution $\Delta d$ and the reference delta contribution $\Delta x$.

2. The method of claim 1, wherein the cost function is formulated substantially as in equation as follows:

$$J = \sum_{t=1}^{N} \left[ \sum_{t=1}^{M} h_i(t)(d_g)(t) - w_i^T x_g(t) \right]^2 \Big/$$

$$\sum_{t=1}^{N} \sum_{t=1}^{M} \sum_{l=t-1, i, i+1} h_i(t) h_l(t) (\Delta d^2(t) - W_i^T \Delta d \Delta X^T W_j + W_i^T \Delta X(t) \Delta X^T(t) W_l)$$

3. The method of claim 1, wherein the cost function is formulated substantially as in equation as follows:

$$J = \sum_{t=1}^{N} [h_i(t)(d_g(t) - w_i^T x_g(t))]^2 \Big/$$

$$\sum_{t=1}^{N} h_i(t)(\Delta d^2(t) - 2 \Delta d \Delta X^T W_j + W_i^T \Delta X(t) \Delta X^T(t) W_l)$$

4. The method of claim 1, wherein the reference delta contribution $\Delta x$ is pre-calculated by processing a portion of the seismic data set that is known to be substantially free of a ground roll contribution.

5. An adaptive filter operable to remove ground roll from a measured signal of seismic data, comprising:

a plurality of M filter channels having respective weights $w_i$ and time windows $h_i$; the filter channels having inputs operable to receive an input signal and an output connected to combine respective outputs from the M filter channels; and an adaptive algorithm operable to obtain values for the weights $w_i$ by seeking a minimum in a cost function J, wherein the adaptive algorithm regards the measured signal d as being represented by a summation of a ground roll contribution $d_g$ and a delta contribution $\Delta d$, the delta contribution $\Delta d$ being a summation of a reflected signal component and an random noise component ($d = d_g + \Delta d$), wherein the adaptive algorithm regards the reference signal x as being represented as the summation of a ground roll contribution $x_g$ and a delta contribution $\Delta x$, the delta contribution $\Delta x$ being a summation of a reflected signal component and an random noise component ($x = x_g + \Delta x$), and wherein the cost function J contains a normalization factor including the measured delta contribution $\Delta d$ and the reference delta contribution $\Delta x$.

6. A results data set obtained by adaptive filtering a seismic data set, wherein the seismic data set is obtained by exciting a seismic source to generate energy which propagates through a subsurface and is partially reflected by structure in the subsurface to an array of receivers, the receivers thereby receiving reflected signal and additionally also a ground roll contribution, the adaptive filtering comprising:

providing an adaptive filter comprising a plurality of M filter channels having respective weights $w_i$ and time windows $h_i$;

configuring the adaptive filter using an adaptive algorithm to obtain values for the weights $w_i$ by seeking a minimum in a cost function J; and filtering the data set with the configured adaptive filter to attenuate ground roll, wherein the seismic data set comprises a measured signal d which is represented in the adaptive algorithm as a summation of a ground roll contribution $d_g$ and a delta contribution $\Delta d$, the delta contribution $\Delta d$ being a summation of a reflected signal component and a random noise component ($d = d_g + \Delta d$), wherein a reference signal x used by the adaptive algorithm is represented as the summation of a ground roll contribution $x_g$ and a delta contribution $\Delta x$, the delta contribution $\Delta x$ being a summation of a reflected signal component and an random noise component ($x = x_g + \Delta x$), and wherein the cost function J contains a normalization factor including the delta contribution $\Delta d$ and the delta contribution $\Delta x$.

7. A computer system loaded with machine readable instructions executable to carry out an adaptive filtering method to remove ground roll from seismic data, the method comprising:

providing a seismic data set obtained by exciting a seismic source to generate energy which propagates through a subsurface and is partially reflected by structure in the subsurface to an array of receivers, the receivers thereby receiving reflected signal and additionally also a ground roll contribution caused by seismic energy;

providing an adaptive filter comprising a plurality of M filter channels having respective weights $w_i$ and time windows $h_i$;

configuring the adaptive filter using an adaptive algorithm to obtain values for the weights $w_i$ by seeking a minimum in a cost function J; and filtering the data set with the configured adaptive filter to attenuate ground roll, wherein the seismic data set comprises a measured signal d which is represented in the adaptive algorithm as a summation of a ground roll contribution $d_g$ and a delta contribution $\Delta d$, the delta contribution $\Delta d$ being a summation of a reflected signal component and a random noise component ($d = d_g + \Delta d$), wherein a reference signal x used by the adaptive algorithm is represented as the summation of a ground roll contribution $x_g$ and a delta contribution $\Delta x$, the delta contribution $\Delta x$ being a summation of a reflected signal component and an random noise component ($x = x_g + \Delta x$), and wherein the cost function J contains a normalization factor including the delta contribution $\Delta d$ and the delta contribution $\Delta x$.

8. A data storage medium bearing machine readable instructions executable to carry out an adaptive filtering method to remove ground roll from seismic data, the method comprising:

provide a seismic data set obtained by exciting a seismic source to generate energy which propagates through a subsurface and is partially reflected by structure in the subsurface to an array of receivers, the receivers thereby receiving reflected signal and additionally also a ground roll contribution;

providing an adaptive filter comprising a plurality of M filter channels having respective weights $w_i$ and time windows $h_i$;

configuring the adaptive filter using an adaptive algorithm to obtain values for the weights $w_i$ by seeking a minimum in the partial differential of a cost function J with respect to the weights $w_i$; and filtering the data set with the configured adaptive filter to attenuate ground roll, wherein the seismic data set comprises a measured signal d which is represented in the adaptive algorithm as a summation of a ground roll contribution $d_g$ and a delta contribution $\Delta d$, the delta contribution $\Delta d$ being a summation of a reflected signal component and a random noise component ($d=d_g+\Delta d$), wherein a reference signal x used by the adaptive algorithm is represented as the summation of a ground roll contribution $x_g$ and a delta contribution $\Delta x$, the delta contribution $\Delta x$ being a summation of a reflected signal component and a random noise component ($x=x_g+\Delta x$), and wherein the cost function J contains a normalization factor including the delta contribution $\Delta d$ and the delta contribution $\Delta x$.

* * * * *